United States Patent [19]
Kido

[11] Patent Number: 5,606,742
[45] Date of Patent: Feb. 25, 1997

[54] SELECTIVELY CALLED RADIO RECEIVER WITH BIT RATE DETECTION FOR BATTERY AT SHORTER THAN A FRAME PERIOD

[75] Inventor: Toru Kido, Tokyo, Japan

[73] Assignee: NEC Corporation, Tokyo, Japan

[21] Appl. No.: 351,022

[22] Filed: Dec. 7, 1994

[30] Foreign Application Priority Data

Dec. 16, 1993 [JP] Japan .................................. 5-316226

[51] Int. Cl.$^6$ .................................. H04B 1/16; H04J 3/06
[52] U.S. Cl. .................. 455/343; 455/38.3; 340/825.44; 370/514; 375/368
[58] Field of Search ................................... 455/38.1, 38.2, 455/38.3, 343; 340/825.44; 375/368; 370/105.4, 105.5

[56] References Cited

U.S. PATENT DOCUMENTS 5,487,090  1/1996  Ide ........................................... 455/343

FOREIGN PATENT DOCUMENTS

| 0071425 | 2/1983 | European Pat. Off. . |
|---|---|---|
| 0482632 | 4/1992 | European Pat. Off. . |
| 2136179 | 9/1984 | United Kingdom . |
| 2144565 | 3/1995 | United Kingdom . |
| 0459997 | 9/1990 | WIPO . |

*Primary Examiner*—Chi H. Pham
*Attorney, Agent, or Firm*—Sughrue, Mion, Zinn, Macpeak & Seas

[57] ABSTRACT

In a selectively called radio receiver operable in a battery saving method in which frame synchronism is established after establishment of bit synchronism and in which a bit rate detection signal is produced by detecting a bit rate of an arriving radio signal to establish the frame synchronism before lapse of a frame synchronism establishing interval after establishment of the bit synchronism or restoration of bit synchronism subjected to a failure, repeated production of the bit rate detection signal at a regular interval is monitored by determining for the regular interval a unit time interval shorter than a frame period of the radio signal. Preferably, the unit time interval is equal to a four-codeword length of codewords, such as the frame period, when sixteen is the number of codewords in a typical frame.

28 Claims, 5 Drawing Sheets

SELECTIVELY CALLED RADIO RECEIVER WITH BIT RATE DETECTION FOR BATTERY AT SHORTER THAN A FRAME PERIOD

BACKGROUND OF THE INVENTION

This invention relates to a battery saving method for a selectively called radio receiver and to a selectively called radio receiver operable in a battery saving mode.

For a selectively called radio receiver with a battery included, various manners of battery saving are in practical use. In general, each of such select selectively called radio receivers is rendered alive or put in an active state as an active receiver with the battery switched on and is primarily intermittently activated to achieve the battery saving. Towards such active receivers, a base station transmits a radio signal carrying a preamble and, in successive frame periods, information signals collectively as a transmission signal of a bit or baud rate. Each active receiver begins to receive the radio signal as a reception signal while intermittently activated. Towards the base station, the selectively called radio receiver can send a radio signal which may have a different bit rate.

It will be presumed, as in a format specified by the British Post Office Code Standardization Advisory Group (BOCSAG), that the radio signal for transmission as the transmitted signal comprises, in each frame period, a frame synchronization signal and first or primary through N-th or N-ary codewords, where N represents a predetermined integer, such as sixteen. Each of the frame synchronization signals and the codewords in the frame periods consists of a predetermined number of binary bits, such as thirty-two bits. For each frame period as herein called, a combination of the frame synchronization signal and the first through the N-th codewords is called a batch in the art.

In each frame period, the (n-1)-th and n-th codewords collectively form a p-th or p-ary group, where n is variable between 2 and N, both inclusive, and p is consequently variable between 1 and P or N/2. Irrespective of active and inactive status, the radio receivers are grouped into first through P-th groups. In at least one of the successive frame periods that consecutively appears after the preamble in the radio signal, the codewords of the p-ary group serves as an address signal representative of an address preliminarily assigned to a certain one of the radio receives of the p-th group that will herein be called a particular receiver.

Following the address signal either immediately or with one of the frame synchronization signals interposed, consecutive codewords of the successive frame periods are altogether used as a message signal representative of a message directed to the particular receiver. After reception of one of the frame synchronization signals that immediately follows the preamble as a first synchronization signal, it is ordinally unnecessary for the particular receiver to use other intervening frame synchronization signals. At any rate, such frame synchronization signals, address signals, and message signals are herein collectively called the information signals.

After a certain number of frame periods, the message signal may come to an end for the particular receiver. It is possible in this event to make the codewords of at least one immediately following group carry a new address for a radio receiver of one of the first through the P-th groups. If used to indicate the particular receiver again or a different receiver of the p-th group, the new address is carried by the codewords of the p-ary group or groups which codewords appear after the end of the message signal.

Attention will now be directed to the battery saving in the particular receiver. Intermittently activated by the battery, the particular receiver is first put in an intermittently activated state for selecting the preamble in the reception signal. In the meantime, the particular receiver is said to be in a preamble searching mode of operation. After being detected, the preamble is used to establish bit synchronism between operation of the receiver and the reception signal. With the bit synchronism established, the particular receiver is continuously put in a temporarily continually activated state, or in a frame synchronization signal collating mode of operation. Collated with the bit synchronism kept, the first synchronization signal is used in establishing frame synchronism between operation of the receiver and the reception signal.

With the frame synchronism kept, the particular receiver is usually temporarily deactivated and then activated again by the battery into an address signal collating mode of operation. During the address signal collating mode, the particular receiver is either only once activated during the p-th group in the frame period including the first synchronization signal as a first frame period or repeatedly during the p-ary groups in the frame periods consecutively following the preamble. The address signal collating mode will therefore be referred to alternatively as a synchronously activated state.

With the address signal collated, the particular receiver is put by the battery into a continuously activated state or in a message receiving mode of operation of decoding the message signal into the message. When the message signal comes to an end, the particular receiver is automatically put back into the intermittently activated state. After the end of the message signal, the particular receiver may alternatively be intentionally put into an inactive state with the battery switched off.

While detecting the information signal in one of the frame synchronization signal collating mode, the address signal collating mode or the message receiving mode, the particular receiver may occasionally go out of bit synchronism or be put unintentionally into the intermittently activated state when no radio signal or noise alone reaches the particular receiver due to severe fading or substantial masking of the transmission signal. The receiver may also go out of bit synchronism when a break occurs in the radio signal and/or external disturbances are imposed on the reception signal. Furthermore, the particular receiver may be put into the intermittently activated state if the reception signal is subjected to either a break or noise before the bit synchronism is wholly established. In the intermittently activated state, the particular receiver is incapable of locating the preamble in such an event.

In accordance with the above example of the manner of battery saving, each active receiver detects the bit rate of the reception signal as a detected bit rate in a bit rate detection interval to produce a bit rate detection signal while put in the intermittently activated state. If the detected bit rate coincides with the bit rate given to the radio signal as a predetermined bit rate the bit rate detection is successful. The bit rate detection fails if either no signal or only noise is detected at the receiver in question.

If the bit rate is again successfully detected after the bit synchronism is lost in the particular receiver during the synchronously and the continuously activated states, the detected bit rate is used in restoring the bit synchronism so as to establish the frame synchronism for subsequent continuation of the synchronously and the continuously activated states to collate the address signal and to receive the message signal. The particular receiver is therefore temporarily continuously activated during a frame synchronism recovering interval immediately following production of the bit rate detection signal. While activated, the particular receiver collates the frame synchronization signal as a fresh synchronization signal in one of the successive frame periods that either immediately or subsequently follows production of the bit rate detection signal as a fresh frame period.

If the bit rate is successfully detected while the bit synchronism is not yet wholly established in the particular receiver during progress of the preamble in the reception signal, the detected bit rate is used in completely establishing the bit synchronism. As soon as the preamble comes to its end, the particular receiver is temporarily continuously activated for collation of the first synchronization signal. After establishment of the frame synchronism, the particular receiver collates the address signal and receives the message signal.

The first synchronization signal is collated while the particular receiver is first temporarily continually activated during a one-codeword length. In contrast, the fresh synchronization signal is collated while the particuler receiver is later temporarily continuously activated during the frame synchronism recovering interval which may last from the one-codeword length to as long as one frame period.

Examples of bit rate detection are disclosed by Motoki Ide in U.S. patent application Ser. No. 134,685 filed Oct. 12, 1993, for assignment to the present assignee. In the Ide patent application, the bit rate detection is improved above all in its detection sensitivity. The bit rate detection is given the one-codeword length. The frame synchronism recovering interval is given the one frame period, namely, a seventeen-codeword length according to the format specified by the BOCSAG. The Ide patent application is herein incorporated by reference.

An improved battery saving method is revealed by Masahiro Matai and Hiroyasu Kuramatsu in U.S. patent application Ser. No. 180,360 filed Jan. 12, 1994, (herein after "Matai") for assignment to the present assignee. This Matai patent application will also be incorporated herein by reference. Counterpart patent applications were filed as an EP patent application and national applications in some other countries.

In the Matai patent application, the bit synchronism is established independently of the preamble. In the particular receiver, the preamble is used for detection as the reception signal of the radio signal directed to the first through the P-th groups of receivers. In the Matai et al application, the preamble is searched for during activation for the one-codeword length in contrast to the receiver of Ide in which the particular receiver is put in the intermittently activated state, first only partly, during an eighteen-codeword length or a 576-bit length according to the BOCSAG format.

In the receiver of Matai, the bit rate is detected even if the bit synchronism occasionally collapses as above. In order to give a greater efficiency to the battery saving, the Matai receiver is improved by reducing the bit rate detection duration to only slightly longer than a one-bit length for judgement of whether the bit rate detection appears successful or unsuccessful. Incidentally, the frame synchronism recovery interval is denoted in Matai by a reference symbol Y and is presumably equal to about one frame period, namely the seventeen-codeword length according to the BOCSAG format. It appears in Matai that each bit rate detection interval is equal also to the one frame period.

In the Matai patent application and the prior art described therein, the bit rate detection duration is shorter than the 576-bit length used in the Ide receiver in establishing the bit synchronism. It would therefore be better to say that the Matai receiver and the prior art is put, upon failed establishment of the bit synchronism, in a repeatedly activated state or in a bit rate detection mode of operation in which the particular receiver is activated for the bit rate detection duration repeatedly intermittently at the bit rate detection interval until the bit rate is successfully detected in the reception signal. The detected bit rate is used in recovering or establishing afresh the bit synchronism. In the latter event, the first synchronization signal is collated to establish the frame synchronism. In consideration of both such events, the frame synchronism recovering interval may alternatively be called a frame synchronism establishing interval.

In the manner which will later be described in greater detail, the Matai receiver comprises a receiver section put in the intermittently activated state to establish the bit synchronism and put, immediately following establishment of the bit synchronism, in the temporarily continually activated state to estabish the frame synchronism. Connected to the receiver section, bit rate detecting means is put in the repeatedly activated state, upon an occurrence of a failed establishment of the bit synchronism, to detect the bit rate of the reception signal as the detected bit rate in the bit rate detection period repeatedly at the bit rate detection interval and to produce the bit rate detection signal when the detected bit rate coincides with the predetermined bit rate. Connected to the receiver section and to the bit rate detecting means, control means switches the receiver section into a temporarily continuously for continually activated state of recovering or establishing the frame synchronism before lapse of the frame synchronism establishing interval.

In both the Ide receiver and the Matai receiver, the frame synchronism establishing interval is as long as the one frame period immediately following production of the bit rate detection signal. The radio receiver or the receiver section is consequently kept continuously activated throughout the frame synchronism establishing interval. This adversely affects the efficiency of battery saving.

More particularly, the bit rate detection may appear to be successful if the bit rate detecting means produces the bit rate detection signal by occasionally detecting noise having the predetermined bit rate. In this event, the receiver section is temporarily continually or continuously activated for as long as about one frame in search of the frame synchronization signal which is not in fact present. This results in consumption of an increased average electric current.

SUMMARY OF THE INVENTION

It is consequently an object of the present invention to provide a battery saving method for a selectively called radio receiver, which method has a high battery saving efficiency.

It is another object of this invention to provide a battery saving method which is of the type described and in which a bit rate of an arriving radio signal is detected with a low average electric current after apparent successful bit rate detection.

It is still another object of this invention to provide a battery saving method which is of the type described and in which the radio receiver is put in a repeatedly activated state from another state for only a short interval of time if the bit rate detection is unsuccessful.

It is yet another object of this invention to provide a battery saving method which is of the type described and in which the radio receiver is put, for a short interval of time, into a bit rate detection mode of operation of detecting the bit rate if establishment of frame synchronism fails within a prescribed interval of time.

It is a further object of this invention to provide a selectively called radio receiver which is operable in a battery saving method of the type described.

Other objects of this invention will become clear as the description proceeds.

In accordance with an object of this invention, there is provided a battery saving method which is for use in a selectively called radio receiver comprising a receiver section put in an intermittently activated state while waiting for reception of a radio signal having a bit rate and comprising successive frame periods as a reception signal to establish bit synchronism between the receiver section and the the reception signal. Immediately following establishment of the bit synchronism, the received section is put in a temporary continually activated state of establishing frame synchronism with the frame periods of the reception signal. The method for battery saving for the receiver described above comprises the steps of (a) detecting, with the receiver section put, upon failed establishment of the bit synchronism, in a repeatedly activated state of being activated for a bit rate detection period repeatedly at bit rate detection intervals, the bit rate of the reception signal as a detected bit rate in the bit rate detection period to produce a bit rate detection signal upon coincidence of the detected bit rate with a predetermined bit rate and (b) switching the receiver section into a temporary continuously activated state of establishing the frame synchronism before lapse of a frame synchronism establishing interval immediately following activation of the receiver section into the repeatedly activated state, wherein the switching step comprises the steps of (A) determining a unit time interval shorter than each of the frame periods and (B) using the unit time interval repeatedly as the bit rate detection interval.

In accordance with a different aspect of this invention, there is provided a selectively called radio receiver, operable in a battery saving mode, for receiving a radio signal having a bit rate and comprising successive frame periods and which comprises (a) a receiver section put in an intermittently activated state while waiting for reception of the radio signal as a reception signal to establish bit synchronism between the receiver section and the bit rate of the reception signal and immediately following establishment of the bit synchronism, put in a temporary continually activated state of establishing frame synchronism between operation of the receiver section and the frame periods of the reception signal, (b) bit rate detecting means for detecting, when the receiver section is put, upon a failed establishment of the bit synchronism, in a repeatedly activated state of being activated for a bit rate detection period repeatedly at the bit rate detection interval, the bit rate of the reception signal as a detected bit rate in the bit rate detection period to produce a bit rate detection signal upon coincidence of the detected bit rate with a predetermined bit rate, and (c) control means for switching the receiver section into a temporary continuously activated state of establishing the frame synchronism before lapse of a frame synchronism establishing interval immediately following activation of the receiver section into the repeatedly activated state, wherein the control means comprises (A) determining means for determining a unit time interval shorter than each of the frame periods and (B) using means for using the unit time interval repeatedly as the bit rate detection interval.

In these aspects of this invention, it is preferred that the bit rate detection period is as short as slightly longer than a one-codeword length of the reception signal and, more preferably, as short as a little longer than a one-bit length of the reception signal. The unit time interval is typically equal to a four-codeword length when each frame period comprises seventeen codewords.

BRIEF DESCRIPTION OF THE DRAWING

FIGS. 2 (A) and (B) are schematic time charts for use in describing operation of a battery saving method used in the radio receiver illustrated in FIG. 1;

FIGS. 5 (A) and (B) schematically show time charts for use in describing operation of the battery saving method used in the radio receiver illustarated in FIG. 3.

DESCRIPTION OF THE PREFERRED EMBODIMENT

Figure 1:
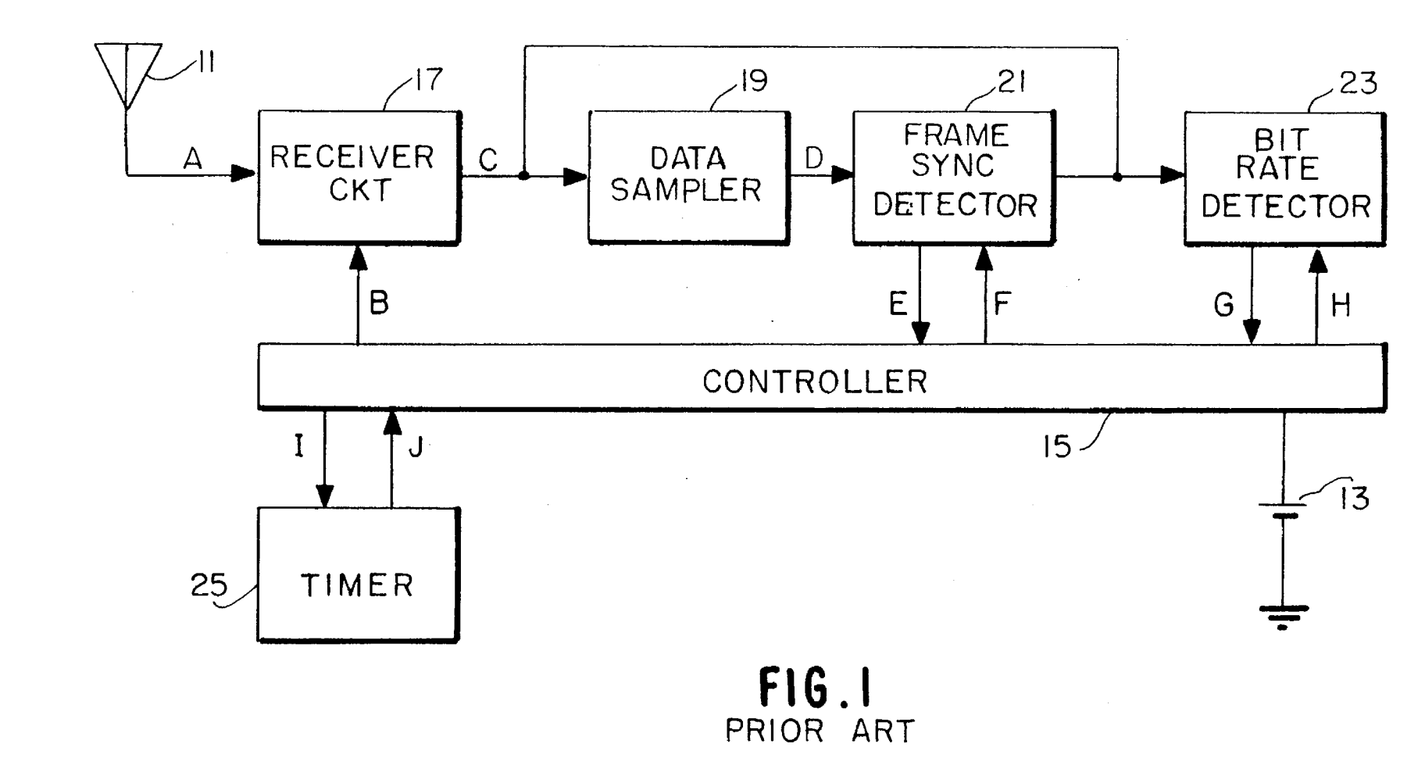
FIG. 1 is a block diagram of a conventional selectively called radio receiver.
Figure 2:
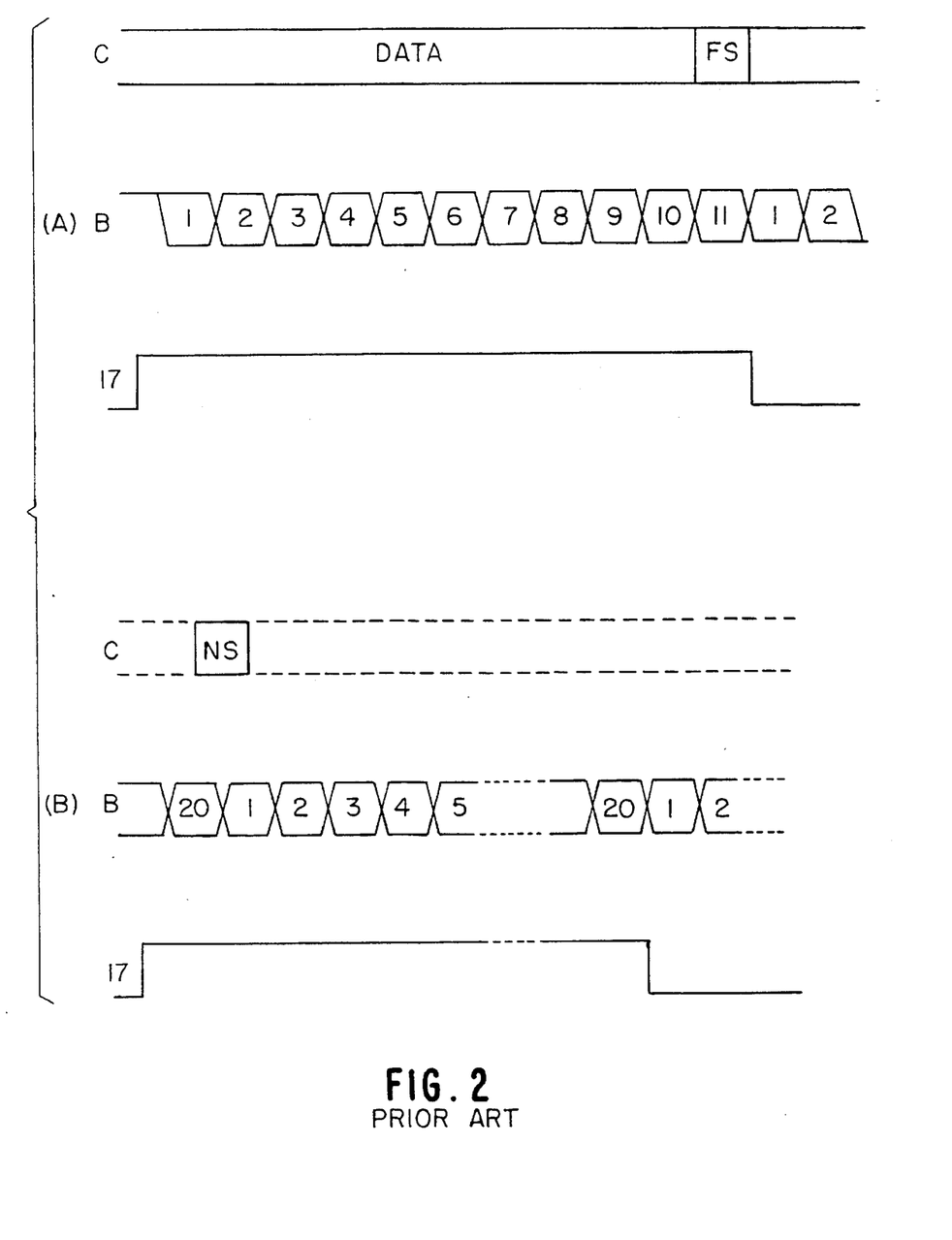

Referring to FIGS. 1 and 2 (A) and (B), the Matai receiver mentioned hereinabove and its battery saving operation will first be described in order to facilitate an understanding of the present invention. As called herein throughout the description, a radio receiver is a selectively called radio receiver for receiving, with battery saving, a radio signal which is transmitted as a transmission signal from a base station (not shown) at a bit rate. It will be assumed that the illustrated radio receiver is in a p-th group of first through P-th groups of receivers which may be alive, active, or inactive, where P represents a predetermined integer which will presently be described, p being variable between 1 and P, both inclusive.

Merely for convenience of the description which follows, it will be presumed, as in a format specified by the British Post Office Code Standardization Advisory Group (BOCSAG) of London, that the radio signal carries a preamble and an information signal following the preamble. The information signal is carried in successive frame period. In each frame, the information signal comprises a frame synchronization signal and first or primary through N-th or N-ary codewords, where N represents a predetermined number, such as sixteen. Each codeword consists of a plurality of binary bits, such as thirty-two bits with some of the binary bits used as check bits. The frame synchronization signal has a one-codeword length of thirty-two bits and a predetermined pattern of binary bits. The preamble has an eighteen-codeword length or a 576-bit length and a unique pattern of binary bits.

In the successive frames, (n-l)-ary and n-ary codewords collectively form a p-th or p-ary group of codewords directed to the radio receivers of the p-th group, where n is variable between 2 and N, both inclusive. The frame synchronization signals of the successive frames are directed as a whole to the first through the P-th groups of receivers. It is now understood that P is equal to N/2. In this manner, the groups of codewords are in one-to-one correspondence to the groups of receivers.

In a certain one of the successive frames, at least one codeword of the p-ary group is used as an address signal indicative of one of the addresses individually assigned to the radio receivers of the p-th group. Following the address signal either immediately or with one of the frame synchronization signals interposed, consecutive codewords of the successive frames are collectively used as a message signal representative of a message directed to one of the radio receivers that is given the address indicated by the address signal under consideration. It will be surmised merely for brevity of the description that an address signal is included to indicate the illustrated radio receiver as a particular receiver in one of the successive frames that immediately follows the preamble as a first frame.

In FIG. 1, the radio receiver is equipped with an antenna 11 for receiving the radio signal as a reception signal A of a radio frequency and includes a battery 13. Merely for convenience of illustration, the battery 13 is depicted as connected to a controller 15. When intentionally switched on, the battery 13 puts the radio receiver in an active state. It will now be assumed that the illustrated radio receiver is kept in the active state unless positively mentioned to the contrary.

It may be mentioned here that the controller 15 comprises a built-in oscillator (not shown) for generating an oscillation signal of a controllable frequency substantially at the bit rate of the reception signal while the battery 13 is kept on. Using the oscillation signal, the controller 15 produces a battery saving control signal B for controlling operation of the radio receiver in the manner which will become clear as the description proceeds. It should be noted in this connection that some signal lines are not illustrated in such a figure although several signal lines are explicitly depicted.

The radio receiver comprises a receiver circuit 17 which demodulates, into a demodulated signal D, the reception signal supplied from the antenna 11 while activated by the battery saving control signal delivered from the controller 15. The battery saving control signal puts the receiver circuit 17 first in a preamble searching mode of operation of searching for the preamble in the reception signal. The receiver circuit 17 is therefore activated in the preamble searching mode during a predetermined length of time intermittently until the preamble eventually appears in the reception signal.

Connected to the receiver circuit 17, a data sampler 19 is supplied with the demodulated signal. Controlled by the battery saving control signal delivered from the controller 15, the data sampler 19 successively produces samples D of the demodulated signal. While the battery saving control signal indicates the preamble searching mode, the data sampler 19 samples the preamble for delivery to the controller 15.

In the Matai receiver, the data sampler 19 is operable with bit synchronism preliminarily established between the battery saving control signal and the binary bits of the reception signal. The predetermined length of time is equal to a one-codeword length. Delivered to the controller 15 and collated with the unique pattern of binary bits, the preamble is used by Matai for recognizing reception of the reception signal. It is consequently possible to understand that the preamble is used to establish the bit synchronism. In the Ide receiver mentioned hereinabove, the preamble is used in the controller 15 to build up the bit synchronism. The predetermined length of time is therefore equal to the 576-bit length.

Connected to the data sampler 19, a frame synchronization signal (FRAME SYNC) detector 21 is supplied with the samples. Having collated the preamble delivered from the data sampler 19, the controller 15 makes the battery saving control signal activate the receiver section 17, the data sampler 19, and the frame synchronization signal detector 21 in a temporary continually activated state during the one-codeword length immediately following the preamble searching mode. Activated in this manner in a frame synchronization signal collating mode of operation, the frame synchronization signal detector 21 collates the samples with the predetermined pattern of binary bits. Collated as a first synchronization signal in the first frame, one of the frame synchronization signals E is delivered to the controller 15. In response, the controller 15 sends an operation reset signal F to the frame synchronization signal detector 21 to suspend its operation. Furthermore, the controller 15 establishes frame synchronism between the battery saving control signal and the successive frame periods of the reception signal.

Responsive additionally to the first synchronization signal, the controller 15 makes the battery saving control signal put the receiver section 17 and the data sampler 19 in a synchronously activated state in synchronism with the (n-1)-ary and the n-ary codewords in at least the first frame. Put in this manner in an address signal collating mode of operation, the data sampler 19 delivers the samples of the (n-1)-ary and the n-ary codewords to the controller 15. Collating the address of the particular receiver in the (n-1)-ary and the n-ary codewords of at least the first frame, the controller 15 makes the battery saving control signal put the receiver section 17 and the data sampler 29 in a continuously activated state simultaneously with start of the message signal directed to the particular receiver.

Put in this manner in a message receiving mode of operation, the data sampler 19 delivers the samples of the message signal to the controller 15. In the meantime, it is unnecessary in general .for the frame synchronization signal detector 21 to collate intervening frame synchronization signals of the succcessive frames other than the first frame. Decoding the message signal, the controller 15 supplies a utilization device (not shown) with the message directed to the particular receiver.

The illustrated radio receiver further comprises a bit rate detector 23 connected to the receiver section 17 directly and to the controller 15 and is saliently featured by a timer 25 connected to the controller 15. The bit rate detector 23 is supplied with the demodulated signal without positive establishment of the bit synchronism.

While received, the radio signal may either be interrupted or be subjected to noise. In such an event, the controller 15 may detect collapse of the bit synchronism, as by its incapability of correcting, by the use of the check bits, errors in the samples in the manner described in the Ide patent application referred to hereinabove. The controller 15 thereupon makes the battery saving control signal suspend operation of the data sampler 19 and the frame synchronization signal detector 21 and instead puts the receiver circuit 17 and the bit rate detector 23 in a bit rate detection mode of operation.

Put in the bit rate detection mode, the bit rate detector 23 detects the bit rate of the demodulated signal and consequently of the reception signal as a detected bit rate in a bit rate detection period to produce a bit rate detection signal G for delivery to the controller 15. Responsive to the bit rate detection signal, the controller 15 compares the detected bit rate with a predetermined bit rate at which the transmission signal is being transmitted.

When this comparison indicates lack of coincidence, the detected bit rate is not that of the reception signal but presumably results from the noise or a like external disturbance being received at the antenna 11. That is, the bit rate detection fails or is unsuccessful. The controller 15 makes the battery saving control signal keep the receiver section 17 and the bit rate detector 23 in the bit rate detection mode until the bit rate is eventually successfully detected.

If the bit rate detection is successful, the controller 15 uses the detected bit rate in restoring the bit synchronism, sends a bit rate detection operation reset signal H to the bit rate detector 23, and makes the battery saving control signal put the receiver section 17, the data sampler 19, and the frame synchronization signal detector 21 in a temporary continuously activated state. Delivered to the frame synchronization signal detector 21 in the meantime, the samples are collated with the predetermined pattern of binary bits.

If successfully collated as a fresh synchronization signal in one of the frames that follows production of the bit rate detection signal as a fresh frame, the frame synchronization signal of the fresh frame is used by the controller 15 in recovering the frame synchronism and in continuing reception of the message signal. The temporary continuously activated state must therefore last at least the one-codeword length and at most throughout a one-frame-period length, namely, a seventeen-codeword length according to the BOCSAG format. This duration of the temporary continuously activated state is herein called a frame synchronism recovering or establishing interval and is in contrast to that of the temporarily continually activated state of the one-codeword length in which the first synchronization signal is collated.

For delivery to the timer 25, the controller 15 produces a timer start signal I concurrently with start of activation of the receiver section 17 and the bit rate detector 23 into the bit rate detection mode. Responsive to the timer start signal, the timer 25 measures a short duration of time which is equal to a sum of a substantially common build-up time of the receiver section 17 and the bit rate detector 21 and a one-bit length. Having measured the short duration, the timer 25 produces for delivery to the controller 15 a timer end signal J. In response to the timer end signal, the controller 15 makes the battery saving control signal put the receiver section 17 and the data sampler 19 and, as the case may be, the frame synchronization signal detector 21 back into one of the frame synchronization signal collating mode, the synchronously activated state, and the message receiving mode from the bit rate detection mode during which the bit rate detector 23 is capable of producing the bit rate detection signal when the bit rate detection is successful. In other words, the timer start and end signals define in cooperation each bit rate detection interval.

In conventional radio receivers described in the foregoing, the frame synchronism establishing interval lasts at most one frame period. Even if coincident with the predetermined bit rate, the detected bit rate may result from detection of the noise. In this event, the frame synchronization signal is not detected even after lapse of the frame synchronism establishing interval. Accordingly, the battery saving of the receiver has a reduced efficiency.

In FIG. 2 (A), operation of the above-mentioned receiver circuit 17, frame synchronization signal detector 21, and bit rate detector 23 is exemplified in the bit rate detection mode and in the temporarily continuously activated state. It is presumed that the bit rate detection is successful.

The demodulated signal is depicted along a top or first row with a label C used in FIG. 1. For use in the bit rate detection, the codewords are indicated by a legend DATA. The fresh synchronization signal is illustrated as FS.

Immediately following the successful bit rate detection, lapse of the frame synchronism establishing interval is indicated by a word count 1, 2, and so forth of codewords. The word count is depicted for the time being by the battery saving control signal illustrated along a second row with a label B used in FIG. 1 and is counted in the manner which is known in the art and will shortly be described. It is assumed that the fresh synchronization signal is collated when the codewords are counted up to 11.

For the temporary continuously activated state, the receiver circuit 17 is activated and deactivated as depicted by high and low levels along a third or bottom row labelled 17. In the manner which will later be described again, the receiver circuit 17 is activated together with the bit rate detector 23 when the controller 15 detects collapse of the bit synchronism during at least partial establishment of the frame synchronism. The word count starts the build-up time after start of activation of the receiver circuit 17.

In FIG. 2 (B), the operation is likewise exemplified. It is presumed that no reception signal is present except for the noise as depicted along a top or first row C by a legend NS. In the battery saving control signal B, the word count starts upon production of the bit rate detection signal due to this erroneous detection of the bit rate. The receiver circuit 17 is nevertheless activated in vain as exemplified along a third or bottom row labelled 17.

Figure 3:
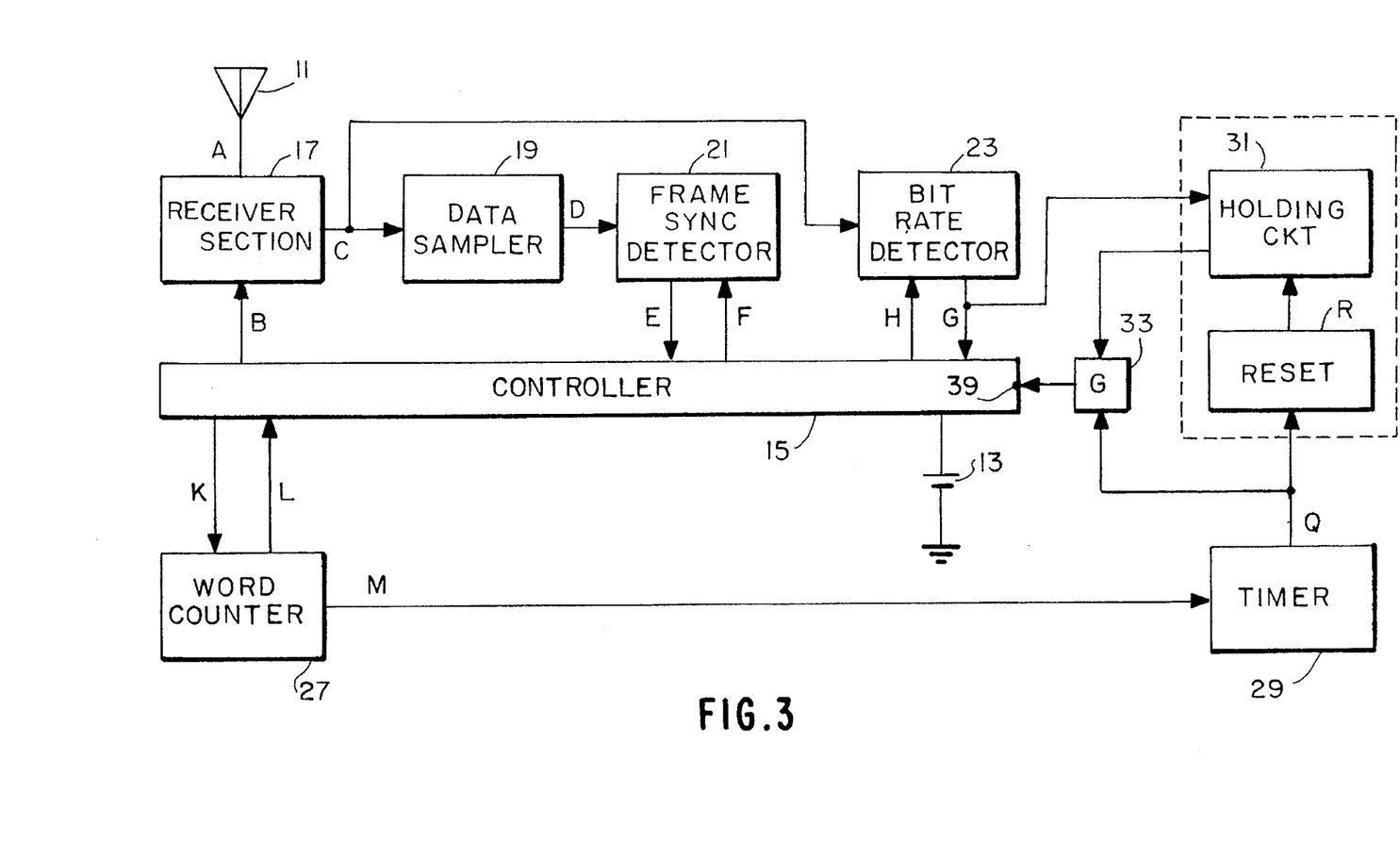
FIG. 3 is a block diagram of a selectively called radio receiver according to an embodiment of the instant invention.

Referring now to FIG. 3, the description will proceed to a radio receiver according to a preferred embodiment of the present invention. Similar parts are designated by like reference numerals and are similarly operable with likewise named and likewise denoted signals.

Connected to the controller 15, a word counter 27 is similar to that used in the Ide receiver and is activated by a count start signal K which the controller 15 produces when supplied with the bit rate detection signal. Activated, the word counter 27 is reset to zero and counts up a word count of the codewords supplied through the controller 15 from zero towards a prescribed number N' which is greater than the predetermined number N of codewords in each frame and is equal, for example, to twenty. The word count tracks the lapse of each bit rate detection interval and of the frame synchronism recovering or establishing interval. Counting up the word count, the word counter 27 produces a count end signal L when the word count reaches the prescribed number. Supplied with the count end signal, the controller 15 makes the battery saving control signal repeatedly specify the bit rate detection period at the bit rate detection interval whenever the word count reaches the prescribed number.

It is possible to make the word counter 27 produce the count end signal with the word count represented from time to time preferably by a binary number. In this event, the word counter 27 is said to produce a word count signal M. When the BOCSAG format is used, the predetermined number of codewords in each frame is represented by the binary number 1111, namely, by decimal sixteen (decimal one being represented by the binary number 0000). In FIG. 3, the word counter 27 is depicted to produce the word count signal separately from the count end signal. This is merely for convenience of illustration.

Although similarly named, a timer 29 is different from the timer 25 described in conjunction with FIG. 1. Supplied from the word counter 27 with the word count signal, the timer 29 successively measures the frame synchronism establishing interval by a unit time interval which is equal to a four-codeword length in the example being illustrated. Each time when the unit time interval is measured, namely, when the word count becomes equal to an integral multiple of four, the timer 29 produces a pulse signal Q.

In more detail, the pulse signal is produced as a first pulse when the word count is reset to zero. A second pulse is produced when the word count signal represent the binary number 0011. In this manner, the timer 29 successively produces third, fourth, and like pulses collectively as the pulse signal.

Connected to the bit rate detector 23, a holding circuit 31 has a reset terminal R and is supplied with the bit rate detection signal G. The holding circuit 31 holds the bit rate detection signal as a held detection signal until reset by the pulse signal delivered from the timer 29 to the reset terminal R. Until reset, the holding circuit 31 produces the held detection signal as a circuit output signal S. Depending on the circumstances, it may be preferable to use a resetting circuit instead of the reset terminal.

Interposed between the controller 15 and the holding circuit 31, a gate circuit 33 is supplied from the holding circuit 31 with the circuit output signal and from the timer 29 with the pulse signal. Whenever the pulse signal is produced, the gate circuit 33 delivers the circuit output signal therethrough as a gate output signal T. More particularly, the gate circuit 33 is open for the gate output signal in response to the pulse signal delivered from the timer 29 when the word count signal represents the word count exceeding a sum of one plus an integral multiple of four. The gate circuit 33 is open during an open interval equal to a half of the one-bit length.

In the holding circuit 31, the held detection signal is first held upon first production of the bit rate detection signal after the bit rate detector 23 is put in the bit rate detection mode. If the first production results from erroneous detection of the noise as the detected bit rate, the bit rate detection signal would not be subsequently produced in regular synchronism with the unit time interval, namely, with every set of four codewords. The bit rate detection signal would indicate correct detection of the bit rate of the reception signal if the signal is produced at regular intervals. This check of regularly repeated production of the bit rate detection signal is important particularly when the bit rate detection period is short, as in the Matai receiver.

The gate output signal is delivered to the controller 15. In response, the controller 15 checks for the presence and absence of the gate output signal and produces a presence and an absence signal when the gate output signal is and is not produced at the regular intervals. While the presence signal is regularly produced, the presence signal makes the controller 15 put by the battery saving control signal the receiver circuit 17, the data sampler 19, and the frame synchronization signal detector 21 in the temporarily continuously activated state. When the absence signal is produced, the absence signal makes the controller 15 keep by the battery saving control signal the receiver circuit 17 and the bit rate detector 23 in the bit rate detection state.

Figure 4:
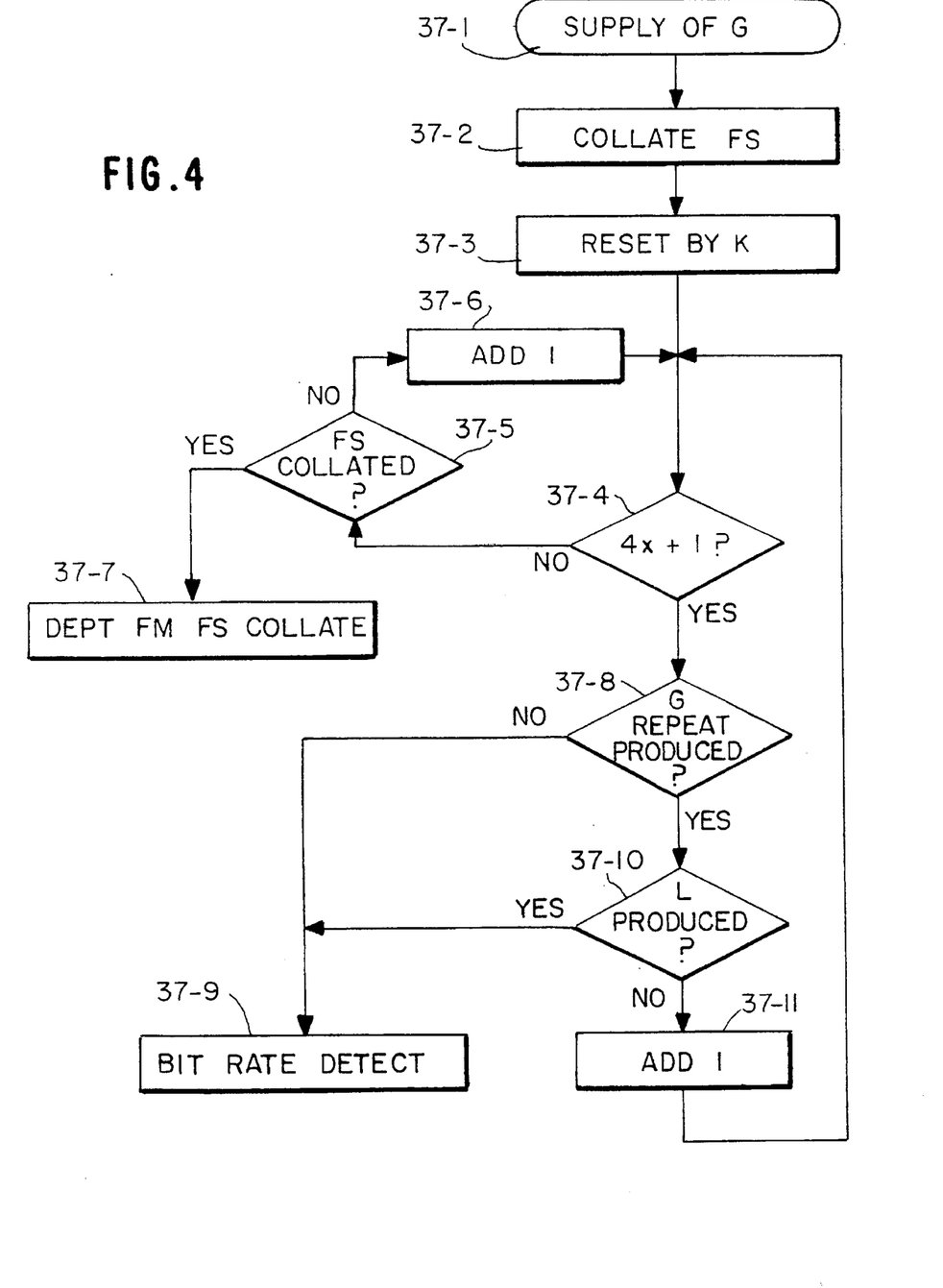
FIG. 4 shows a flow chart for use in describing operation of a battery saving method used in the radio receiver depicted in FIG. 3.

Turning to FIG. 4, with FIG. 3 continuously referred to, a combination of the controller 15, the word counter and the timer 29 will be referred to as a control section 37. It is assumed that the bit rate detection signal G is delivered to the controller 15 in the manner indicated at a first step 37-1 by "SUPPLY OF G". In response, the controller 15 makes the battery saving control signal put the receiver circuit 17, the data sampler 19, and the frame synchronization signal detector 21 in the temporarily continuously activated state for collation of the fresh synchronization signal during progress of the frame synchronism establishing interval as indicated at a second step 37-2 by "COLLATE FS". Supplied with the bit rate detection signal, the controller 15 delivers the count start signal K for reset of the word counter 27 as indicated at a third step 37-3 by "RESET BY K".

The word counter 27 counts up the word count one by one towards a first sum of one plus an integral multiple of four 4 in the manner indicated at a fourth step 37-4 by "4×+1?". Before the word count reaches the first sum, the frame synchronization signal detector 21 continuously searches for the fresh synchronization signal as depicted at a fifth step 37-5 by "FS COLLATED ?". If NO, the controller 15 makes the word counter 27 add one to the word count as indicated at a sixth step 37-6 by "ADD 1". If YES, the controller 15 puts the receiver circuit 17 and the data sampler 19 in a state which departs from the temporary continuously activated state of collating the fresh synchronization signal as indicated at a seventh step 37-7 by "DEPT FM FS COLLATE". This fresh synchronization signal collating mode departs into, for example, the message receiving mode.

During the fifth and the sixth steps, the word count is less than the first sum. The sixth step therefore proceeds to the fourth step. It should be noted that the receiver circuit 17 and the bit rate detector 23 are put in the meantime into the bit rate detection mode by the first and other pulses and are operable also in the temporary continuously activated state together with the data sampler 19 and the frame synchronization signal detector 21.

When the word count becomes equal to or greater than the first sum at the fourth step, the controller 15 checks for repeated production of the bit rate detection signal by the gate output signal in the manner indicated at an eighth step 37-8 by "G REPEAT PRODUCED ?" before the word count reaches a second sum of one plus four times an integer which may be greater than the integer used in the integral multiple for the first sum. If this check of repeated production fails, the controller 15 makes the battery saving control signal put the receiver circuit 17 and the bit rate detector 23 in the bit rate detection mode as indicated at a ninth step 37-9 by "BIT RATE DETECT".

The integer used in the second sum may be equal to that used in the first sum. The fresh synchronization signal is therefore collated at the fifth step while the repeated production is checked at the eighth step.

After the second sum is reached at the eighth step, the word count arrives in due course at the prescribed number N'. In this event, the word counter 27 delivers the count end signal L to the controller 15. Whether or not the count end signal is produced is judged by the controller 15 in the manner indicated at a tenth step 37-10 by "L PRODUCED ?".

Before production of the count end signal, one is added to the word count as indicated at an eleventh step 37-11 by "ADD 1". Even incremented by one, the word count may still be less than the first sum. The eleventh step therefore proceeds to the fourth step. When the count end signal is eventually produced, the controller 15 makes the battery saving control signal put the receiver circuit 17 and the bit rate detector 19 in the bit rate detection mode at the ninth step.

Figure 5:
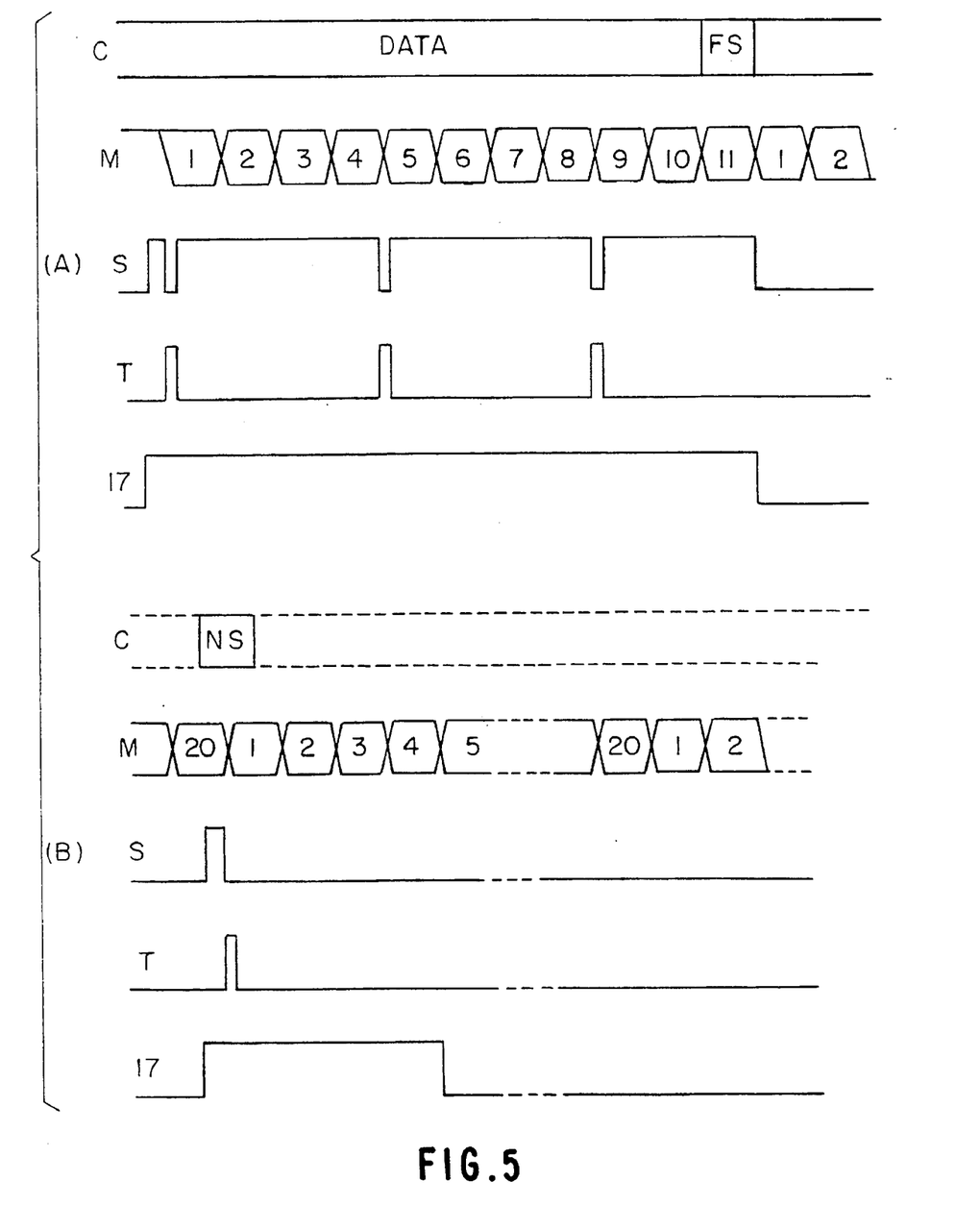

Referring to FIGS. 5 (A) and (B) and again to FIGS. 3 and 4, operation of the receiver circuit 17, the data sampler 19, the frame synchronization signal detector 21, the bit rate detector 23, the word counter 27, the timer 29, the holding circuit 31, the gate circuit 33, and the controller 15 will be described more in detail. Like FIGS. 2 (A) and (B), FIGS. 5 (A) and (B) show the operation while the radio signal is duly received as the reception signal and when the noise NS alone is received rather than the reception signal.

In FIG. 5 (A), the demodulated signal is depicted along a top or first row labelled C as in FIG. 2 (A). Instead of the battery saving control signal illustrated in FIG. 2 (A), the word count signal is exemplified along a second row with a label M. The fresh synchronization signal FS appears in the demodulated signal when the word count reaches 11 in the manner which will presently be described and is shown in FIG. 2 (A).

The circuit output signal is illustrated along a third row with a label S. The gate output signal is depicted along a fourth row with a label T. The receiver circuit 17 is activated and deactivated as depicted with high and low levels along a fifth or bottom row labelled 17.

In the manner described above, the receiver circuit 17 is put together with the bit rate detector 23 into the bit rate detection mode when the controller 15 finds a failure either in proceeding with establishment of the bit synchronism or in establishment of the frame synchronism. After the build-up time of the bit rate detector 23, the bit rate detection signal is first produced as depicted in FIG. 4 at the first step 37-1 and appears as the circuit output signal in the manner illustrated herein by a high level along the third row.

The frame synchronism establishing interval proceeds while the receiver circuit 17, the data sampler 19, and the frame synchronization signal detector 21 are put in the temporary continuously activated state as depicted in FIG. 4 at the second step 37-2. The word counter 27 is reset to zero as indicated at the third step 37-3 and immediately thereafter makes the word count represent I as exemplified herein along the second row. The timer 29 produces the first pulse. In response, the circuit output signal is reset to a low level. Furthermore, the gate output signal is first produced as depicted along the fourth row. Although supplied with the gate output signal, the controller 15 keeps the receiver circuit 17, the data sampler 19, and the frame synchronization signal detector 21 in the temporarily continuously activated state. The controller 15, however, puts the receiver circuit 17 and the bit rate detector 23 in the bit rate detection mode before production of this gate output signal.

When the word count increases from 4 to 5 as illustrated along the second row, the timer 29 produces the second pulse. In the meantime, the word count is incremented one by one as depicted in FIG. 4 at the fourth through the sixth steps 37-4 to 37-6. The bit rate detector 23 again produces the bit rate detection signal. In response, the circuit output signal is continuously produced.

When the word count grows from 8 to 9, the third pulse is produced. The circuit output signal is reset to the low level. Meanwhile, repeated production of the bit rate detection signal is checked at the eighth step 37-8 of FIG. 4.

The word count is incremented as depicted in FIG. 4 at the tenth and the eleventh steps 37-10 and 37-11. In due course, the frame synchronization signal detector 21 collates the fresh synchronization signal in the manner depicted at the fifth step 37-5 in FIG. 4 and herein along the second row at the word count 11. The controller 15 switches the receiver circuit 15 and the bit rate detector 23 departing from the temporary continuously activated state.

In FIG. 5 (B), the receiver circuit 17 is supplied with the noise NS instead of the deception signal in the manner illustrated along a top or first row labelled C. The word count signal is exemplified along a second row labelled M. It is now presumed that the bit rate detector 23 detects the noise erroneously as the detected bit rate and produces the bit rate detection signal.

Responsive to the bit rate detection signal, the holding circuit 31 produces the circuit output signal as depicted along a third row with the label S. The gate output signal is produced as in a fourth row labelled T in response to the first pulse supplied from the timer 29. The receiver circuit 17 is activated as depicted along a fifth or bottom row labelled 17.

Inasmuch as produced in response to the noise which occasionally has the predetermined bit rate, the bit rate detection signal is not regularly produced. For example, neither the circuit output signal nor the gate output signal is produced when the timer 29 produces the second pulse. As a consequence, the controller 15 detects absence of regular production of the gate output signal and puts the receiver circuit 17 and the bit rate detector 23 from the temporarily continuously activated state back into the bit rate detection mode when the second pulse is produced.

Reviewing FIGS. 3 through 5 with the background of this invention taken into account, it is understood that collation of the successive samples with the predetermined pattern of binary bits may be for whichever of the first and the fresh synchronization signals after production of the bit rate detection signal. Consequently, the temporarily continuously and continually activated states are not substantially different from each other. The intermittently activated state for the preamble searching mode is likewise not different in effect from the repeatedly activated state for the bit rate detection mode particularly when the receiver circuit 17 is activated only during the one-codeword length for the bit rate detection period as in the Matai receiver.

Furthermore, it should be understood that activation of the receiver section 17 and the bit rate detector 23 may mean start of activation rather than full activation. It is possible to understand that a point 39 of connection of the gate circuit 33 to the controller 15 serves as a signal detecting means for detecting, during progress of the frame synchronism establishing interval, whether or not the gate output signal is regularly repeatedly produced.

While this invention has thus far been described in specific conjunction with only one preferred embodiment thereof, it will now be readily possible for one skilled in the art to put this invention into effect in various other manners. For example, it is possible to apply this invention to a battery saving method and to a selectively called radio receiver for a radio signal of a format which is other than that of the BOCSAG provided that the format satisfies the conditions set forth in the appended claims. It is possible to use a multilevel bit in place of each binary bit.

What is claimed is:

1. A battery saving method for use in a selectively called radio receiver comprising a receiver section put in an intermittently activated state while waiting for reception of a radio signal, having a signal bit rate and comprising successive frame periods, as a reception signal to establish bit synchronism between said receiver section and said reception signal, and wherein said receiver section is put in a temporary continually activated state to establish frame synchronism with frame periods of said reception signal following establishment of said bit synchronism, said battery saving method comprising the steps of:

detecting, with said receiver section put in a repeatedly activated state for a bit rate detection period spaced by a bit rate detection interval when an error occurs in bit synchronism, the bit rate of said reception signal as a detected bit rate in said bit rate detection period;

producing a bit rate detection signal upon coincidence of said detected bit rate with said signal bit rate; and switching said receiver section into a temporary continuously activated state to establish said frame synchronism before lapse of a frame synchronism establishing interval following activation of said receiver section to said repeated activated state, wherein said switching step comprises the steps of:

determining a unit time interval shorter than each of said frame periods; and using said unit time interval repeatedly as said bit rate detection interval.

2. A battery saving method as claimed in claim 1, wherein said determining step begins to determine, during said frame synchronism establishing interval, said unit time interval immediately following first production of said bit rate detection signal.

3. A battery saving method as claimed in claim 2, wherein said using step repeatedly checks production of said bit rate detection signal once within said unit time interval during said frame synchronism establishing interval.

4. A battery saving method as claimed in claim 1, wherein said using step comprises the steps of:

checking, during said frame synchronism establishing interval immediately following first production of said bit rate detections signal, repeated production of said bit rate detection signal; and switching said receiver section into said repeatedly activated state if check of said repeated production fails.

5. A battery saving method as claimed in claim 4, said radio signal comprises frame periods of a predetermined number of codewords of a common codeword length, wherein said determining step determines said unit time interval is not longer than a fraction of a total length of the codewords in each of said frame periods.

6. A battery saving method as claimed in claim 5, wherein said predetermined number is equal to an integral multiple of four, and wherein said determining step determines said unit time interval corresponds to four times said common codeword length.

7. A battery saving method as claimed in claim 1, said radio signal comprises frame periods of a predetermined number of codewords of a common codeword length, wherein said determining step determines said unit time interval is not longer than a fraction of a total codeword length of the codewords in each of said frame periods.

8. A battery saving method as claimed in claim 7, wherein said predetermined number is equal to an integral multiple of four, and wherein said determining step determines said unit time interval corresponds to four times said common codeword length.

9. A selectively called radio receiver, operable in a battery saving mode, for receiving a radio signal having a bit rate and comprising successive frame periods, said radio receiver comprising:

a receiver section put in an intermittently activated state while waiting for reception of said radio signal as a reception signal to establish bit synchronism between said receiver section and the bit rate of said reception signal, and wherein said receiver section is put in a temporary continually activated state to establish frame synchronism with frame periods of said reception signal following establishment of said bit synchronism;

bit rate detecting means for detecting, when said receiver section is put in a repeatedly activated state of being activated for a bit rate detection period spaced by a bit rate detection interval when an error occurs in bit synchronism, the bit rate of said reception signal as a detected bit rate in said bit rate detection period to produce a bit rate detection signal upon coincidence of said detected bit rate with said signal bit rate; and control means for switching said section to a temporary continuously activated state to establish said frame synchronism before lapse of a frame synchronism establishing interval immediately following activation of said receiver section into said repeatedly activated state, wherein aid control means comprises:

determining means for determining a unit time interval shorter than each of said frame periods; and using means for using said unit time interval repeatedly as said bit rate detection interval.

10. A selectively called radio receiver as claimed in claim 9, wherein said determining means begins to determine, during said frame synchronism establishing interval, said unit time interval immediately following first production of said bit rate detection signal.

11. A selectively called radio receiver as claimed in claim 10, wherein said using means repeatedly checks for production of said bit rate detection signal once within said unit time interval during said frame synchronism establishing interval.

12. A selectively called radio receiver as claimed in claim 9, wherein said using means comprises:

checking means for checking, during said frame synchronism establishing interval immediately following first production of said bit rate detection signal, repeated production of said bit rate detection signal; and switch back means for switching back said receiver section into said repeatedly activated state if check of said repeated production fails.

13. A selectively called radio receiver as claimed in claim 12, said radio signal comprises frame periods of a predetermined number of codewords of a common codeword length, wherein said determining means determines said unit time interval is not longer than a fraction of a total codeword length of the codewords in each of said frame periods.

14. A selectively called radio receiver as claimed in claim 13, wherein said predetermined number is equal to an integral multiple of four, and wherein said determining means determines said unit time interval corresponds to four times said common codeword length.

15. A selectively called radio receiver as claim in claim 12, said radio signal comprises frame periods of a predetermined number of codewords of a common codeword length, said control means comprising switching means for switching said receiver section to said temporary continuously activated state following production of said bit rate detection signal during said frame synchronism establishing interval; and a word counter for counting, upon production of said bit rate detection signal, a word count of said codewords towards a prescribed number which is not less than said predetermined number, said word counter producing a word count signal representative of said word count, wherein:

said checking means comprises:

timer means responsive to said word count signal for producing a pulse signal each time when said unit time interval lapses during progress of said frame synchronism establishing interval;

holding means for holding said bit rate detection signal as a held detection signal until reset by said pulse signal and for producing said held detection signal as a holding means output signal; and gating means responsive to said pulse signal for gating said holding means output signal as a gating means output signal;

said switch back means detecting, during said frame synchronism establishing interval, whether or not said gating means output signal is repeatedly present, said switch back means switching and keeping said receiver section to said repeatedly activated state when said gating means output signal is not present and to said temporary continuously activated state when said gating means output signal is present.

16. A selectively called radio receiver as claimed in claim 15, wherein:

said word counter begins to count said word count upon first production of said bit rate detection signal;

said timer means first produces said pulse signal when said word counter begins to count said word count.

17. A selectively called radio receiver as claimed in claim 15, wherein said determining means determines said unit time interval is not longer than a fraction of a total codeword length of the codewords in each of said frame periods.

18. A selectively called radio receiver as claimed in claim 17, wherein said predetermined number is equal to an integral multiple of four, and wherein said determining means determines said unit time interval corresponds to four times said common codeword length.

19. A selectively called radio receiver as claimed in claim 9, said radio signal comprising frame periods a predetermined number of codewords of a common codeword length, wherein said determining means determines said unit time interval is not longer than a fraction of a total codeword length of the codewords in each of said frame periods.

20. A selectively called radio receiver as claimed in claim 19, wherein said predetermined number is equal to an integral multiple of four, and wherein said determining means determines said unit time interval corresponds to four times said common codeword length.

21. A battery saving method for use in a selectively called radio receiver comprising a receiver section for receiving a radio signal, having a signal bit rate and comprising successive frame periods, as a reception signal to establish bit synchronism between said receiver section and said reception signal, and wherein said receiver section establishes frame synchronism with frame periods of said reception signal following establishment of said bit synchronism, said battery saving method comprising the steps of:

detecting the bit rate of said reception signal for a bit rate detection period spaced by a bit rate detection interval when an error occurs in bit synchronism;

producing a bit rate detection signal upon coincidence of said detected bit rate with said signal bit rate; and switching said receiver section into a temporary continuously activated state to establish said frame synchronism before lapse of a frame synchronism establishing interval, wherein said switching step comprises the steps of:

determining a unit time interval shorter than each of said frame periods; and using said unit time interval repeatedly as said bit rate detection interval.

22. A battery saving method as claimed in claim 21, wherein said using step repeatedly checks for production of said bit rate detection signal once within said unit time interval during said frame synchronism establishing interval.

23. A battery saving method as claimed in claim 21, said radio signal comprises frame periods of a predetermined number of codewords of a common codeword length, wherein said determining step determines said unit time interval is not longer than a fraction of a total codeword length of the codewords in each of said frame periods.

24. A battery saving method as claimed in claim 23, wherein said predetermined number is equal to an integral multiple of four, and wherein said determining step determines said unit time interval corresponds to four times said common codeword length.

25. A selectively called radio receiver, operable in a battery saving mode, for receiving a radio signal having a bit rate and comprising successive frame periods, said radio receiver comprising:

a receiver section for receiving said radio signal as a reception signal to establish bit synchronism between said receiver section and said reception signal, and wherein said receiver section establishes frame synchronism with frame periods of said reception signal following establishment of said bit synchronism;

bit rate detecting means for detecting a bit rate of said reception signal for a bit rate detection period spaced by a bit rate detection interval when an error occurs in bit synchronism to produce a bit rate detection signal upon coincidence of said detected bit rate with said signal bit rate; and control means for switching said receiver section to establish said frame synchronism before lapse of a frame synchronism establishing interval, wherein said control means comprises:

determining means for determining a unit time interval shorter than each of said frame periods; and using means for using said unit time interval repeatedly as said bit rate detection interval.

26. A selectively called radio receiver as claimed in claim 25, wherein said using means repeatedly checks for production of said bit rate detection signal once within said unit time interval during said frame synchronism establishing interval.

27. A selectively called radio receiver as claimed in claim 25, said radio signal comprises frame periods of a predetermined number of codewords of a common codeword length, wherein said determining means determines said unit time interval is not longer than a fraction of a total codeword length of the codewords in each of said frame periods.

28. A selectively called radio receiver as claimed in claim 27, wherein said predetermined number is equal to an integral multiple of four, and wherein said determining means determines said unit time interval corresponds to four times said common codeword length.

* * * * *